(12) United States Patent
Tamaki et al.

(10) Patent No.: US 8,900,747 B2
(45) Date of Patent: Dec. 2, 2014

(54) METHOD FOR PRODUCING BATTERY ELECTRODE

(75) Inventors: Takumi Tamaki, Nisshin (JP); Tatsuya Hashimoto, Osaka (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/818,441

(22) PCT Filed: Aug. 25, 2010

(86) PCT No.: PCT/JP2010/064418
§ 371 (c)(1),
(2), (4) Date: Feb. 25, 2013

(87) PCT Pub. No.: WO2012/026009
PCT Pub. Date: Mar. 1, 2012

(65) Prior Publication Data
US 2013/0157130 A1 Jun. 20, 2013

(51) Int. Cl.
*H01M 4/139* (2010.01)
*H01M 10/0525* (2010.01)
*H01M 4/13* (2010.01)
*H01M 4/62* (2006.01)
*H01M 4/04* (2006.01)
*H01M 4/1393* (2010.01)
*H01M 4/133* (2010.01)

(52) U.S. Cl.
CPC ............ *H01M 4/622* (2013.01); *Y02T 10/7011* (2013.01); *H01M 10/0525* (2013.01); *H01M 4/13* (2013.01); *H01M 4/1393* (2013.01); *Y02E 60/122* (2013.01); *H01M 4/0404* (2013.01); *H01M 4/139* (2013.01); *H01M 4/623* (2013.01); *H01M 4/133* (2013.01); *H01M 4/62* (2013.01)

USPC .......................................................... 429/211

(58) Field of Classification Search
None
See application file for complete search history.

(56) References Cited

U.S. PATENT DOCUMENTS

| 4,820,813 | A | 4/1989 | Schulz |
| 5,921,479 | A | 7/1999 | Doenges et al. |
| 2006/0099505 | A1* | 5/2006 | Fujino et al. ................. 429/217 |
| 2007/0292765 | A1 | 12/2007 | Inoue et al. |
| 2011/0111295 | A1 | 5/2011 | Yamada |

FOREIGN PATENT DOCUMENTS

| CN | 1706054 | 12/2005 |
| JP | 2-235901 | 9/1990 |
| JP | 9-65890 | 3/1997 |

(Continued)

*Primary Examiner* — Patrick Ryan
*Assistant Examiner* — Wyatt McConnell
(74) *Attorney, Agent, or Firm* — Finnegan, Henderson, Farabow, Garrett & Dunner, LLP (57) ABSTRACT

A main object of the present invention is to provide a method for producing a battery electrode that has excellent adhesion between a collector and an active material layer by suppressing a migration phenomenon. The method for producing a battery electrode of the present invention is a method for producing a battery electrode 30 that has a structure in which an active material layer 20 that includes an active material 22 is held on a collector 10. The method includes a step of applying, onto the collector 10, an active material layer forming paste that contains the active material 22 and polymer materials 24, 26 in a solvent; and a step of drying the applied paste coat material, to form thereby the active material layer 20 on the collector 10. Fibrillated polymer fibers 26 are used as at least one of the polymer materials 24, 26.

8 Claims, 8 Drawing Sheets

(56) References Cited

FOREIGN PATENT DOCUMENTS

| JP | 10-74505 | 3/1998 |
| JP | 10-152501 | 6/1998 |
| JP | 10-251301 | 9/1998 |
| JP | 11-3709 | 1/1999 |
| JP | 2000-100439 | 4/2000 |
| JP | 2005-340071 | 12/2005 |
| JP | 2008-103098 | 5/2008 |
| JP | 2009-193932 | 8/2009 |
| WO | WO 2006/061940 A1 | 6/2006 |
| WO | WO 2010/008058 A1 | 1/2010 |

* cited by examiner

METHOD FOR PRODUCING BATTERY ELECTRODE

CROSS-REFERENCE TO RELATED APPLICATIONS this application is a national phase application of International Application No. PCT/JP2010/064418, filed Aug. 25, 2010, the content of which is incorporated herein By reference.

TECHNICAL FIELD

The present invention relates to a method for producing a battery electrode, and more particularly to a method for producing a battery electrode that has a configuration in which an electrode mix layer containing an electrode active material is held on a collector.

BACKGROUND ART

Recent years have witnessed the growing importance of secondary batteries, such as lithium ion batteries and nickel-hydride batteries, as vehicle-mounted power sources, and as power sources that are provided in, for instance, personal computers and portable terminals. In particular, lithium secondary batteries that are lightweight and afford high energy density are expected to come to be used as preferred high-output power sources that are installed in vehicles. In a typical configuration, such secondary batteries are provided with electrodes wherein a material that is capable of reversibly storing and releasing lithium ions (electrode active material) is held on a conductive member (electrode collector). Representative examples of electrode active materials that are used in negative electrodes (negative electrode active materials) include, for instance, carbon-based materials such as graphite carbon or amorphous carbon. Representative examples of electrode collectors that are used in negative electrodes (negative electrode collectors) include, for instance, sheet-shaped and foil-like members having copper or a copper alloy as a main constituent.

A representative method of causing a negative electrode active material to be held on a negative electrode collector during the production of a negative electrode having such a configuration may be a method that involves coating a negative electrode collector (copper foil or the like) with an active material layer forming paste in which a binder and a powder of a negative electrode active material are dispersed in an appropriate medium, and drying the whole through passage through a hot-air drier or the like, to form thereby a layer (negative electrode active material layer) that comprises the negative electrode active material. The binder that is comprised in the negative electrode active material layer has the function of binding negative electrode active material particles with one another and binding the negative electrode active material and the collector. Patent Literature 1 to 6 are examples of prior art literature pertaining to such binders and the like.

CITATION LIST

Patent Literature

Patent Literature 1; WO 2006/061940
Patent Literature 2: Japanese Patent Application Publication No. H10-251301
Patent Literature 3: Japanese Patent Application Publication No, H02-235901
Patent Literature 4: Japanese Patent Application Publication No. H10-152501
Patent Literature 5: Japanese Patent Application Publication No, 1-109-065890
Patent Literature 6: Japanese Patent Application Publication No. 2005-340071

SUMMARY OF INVENTION

Figure 8:
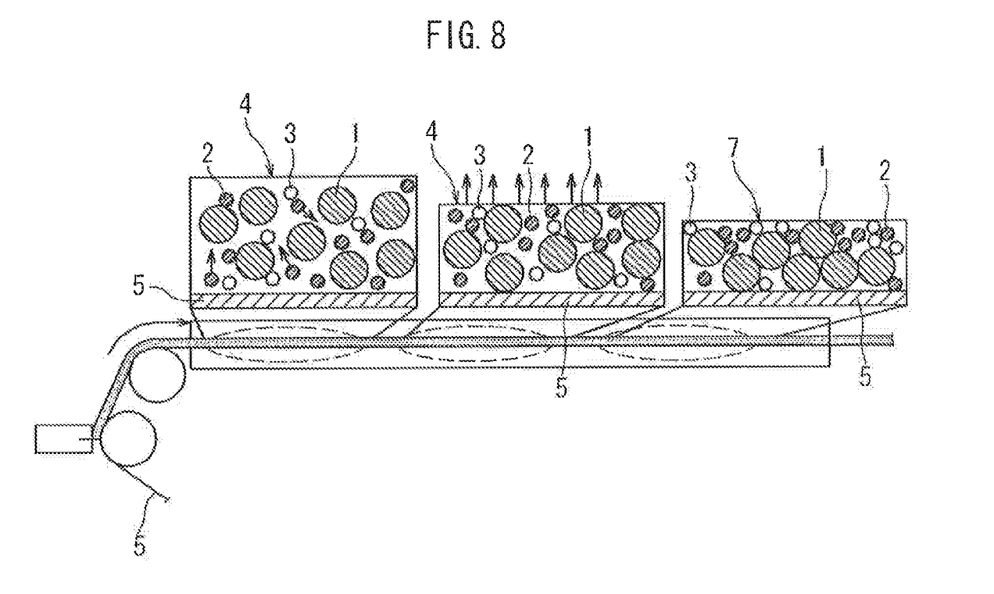
FIG. 8 is a diagram illustrating schematically a conventional electrode production process.

However, convection occurs during drying of a paste coat material when an active material layer forming paste that contains a negative electrode active material 1, a binder 2 and a thickener 3, is coated onto a collector 5 and is dried rapidly, to produce the abovementioned negative electrode, as illustrated in FIG. 8; also, a migration phenomenon occurs whereby the thickener 3 in the vicinity of the collector 5 rises up to a surface layer section of the paste coat material 4 together with the binder 2. As a result of this migration phenomenon, the amount of binder 2 and thickener 3 in the vicinity of the collector 5 decreases, and adhesion between the active material layer 7 and the collector 5 is reduced. This lowered adhesion may cause a drop in battery performance (cycle durability and the like). It is a main object of the present invention, arrived at in the light of the above issues, to provide a method for producing a battery electrode that exhibits good adhesion between a collector and an active material layer through suppression of the above-described migration phenomenon.

The present invention provides a method for producing a battery electrode that has a structure in Which an active material layer including an active material is held on a collector, this method including: a step of applying, onto the collector, an active material layer forming paste that contains an active material and polymer materials for instance, a binder and a thickener) in a solvent; and a step of forming an active material layer on the collector by drying the applied paste coat material. As a characterizing feature of the method, fibrillated polymer fibers are used as at least one type of the polymer materials.

A fibrillation process in the present invention denotes a process of finely splitting polymer fibers and that can be accomplished, for instance, by resorting to mechanical shear forces. The surface of the fibrillated polymer fibers unravels, whereupon numerous fine fibers (fibrils) become formed on the fibers. As a result, the polymer fibers exhibit larger surface irregularities, increased frictional resistance with a solvent, and lower mobility in the solvent (ease of motion of the polymer fibers in the solvent) than polymer fibers that have not been fibrillated.

In the production method of the present invention, polymer fibers the mobility whereof is lowered as a result of the above-described fibrillation process are used as at least one type of the polymer materials (for instance, binder and thickener). Therefore, the polymer materials in the vicinity of the collector do not rise readily to the surface layer section of the paste coat material, even if convection occurs during drying of the paste coat material. As a result, it becomes possible to secure an amount of polymer materials in the vicinity of the collector, and to increase the adhesion between the active material layer and the collector. By virtue of the above features, thus, segregation of the polymer materials, which is caused by the migration phenomenon, can be eliminated or mitigated, and it becomes possible to produce an electrode that comprises an active material layer having good adhesion towards the collector.

In a preferred configuration of the production method disclosed herein, the polymer materials contain a first polymer that functions as a binder and a second polymer that functions as a thickener of the paste, in the active material layer, and the fibrillated polymer fibers are used as at least the second polymer. In such a case, the mobility of the thickener (second polymer) decreases as a result of the fibrillation process, and hence it becomes possible to suppress the phenomenon whereby the thickener in the vicinity of the collector rises up to the surface layer section of the paste coat material, accompanying the binder (first polymer), even if convection occurs during drying of the paste coat material. As a result, the amount of binder and thickener in the vicinity of the collector can be secured, and adhesion between the active material layer and the collector can be enhanced.

An appropriate fiber diameter of the fine fibers (fibrils) that form on the surface of the polymer fibers as a result of the fibrillation process ranges from about 0.3 μm. to 1.0 μm. When the fiber diameter is larger than the above range, sufficient surface irregularities fail to be achieved, and hence the migration phenomenon during drying cannot be suppressed, and adhesion between the active material layer and the collector may decrease. If the fiber diameter is smaller than the above range, the viscosity of the active material layer forming paste increases excessively, and hence bubbles that become entrained during production of the paste fail to be removed before accomplishing drying, and may give rise to pinholes inside the electrode. Therefore, the fiber diameter of the fibrils of the fibrillated polymer fibers (i.e. the fine fibers that form on the surface of the polymer fibers) ranges appropriately from about 0.3 μm to 1.0 μm, preferably from 0.4 μm to 0.9 μm in ordinary cases, and more preferably, for instance, from 0.5 μm to 0.8 μm.

In a preferred configuration of the production method disclosed herein, cellulosic fibers (for instance, carboxymethyl cellulose) are used as the fibrillated polymer fibers. Cellulosic fibers are preferably used as the thickener of the abovementioned paste, in terms of facilitating the fibrillation process.

In the technology disclosed herein, it is not necessary to address the occurrence of uneven distribution of the polymer materials (binder and/or thickener), caused by migration, when setting the drying rate of the paste coat material, Therefore, the paste coat material can be dried quickly. For instance, the solvent in the paste coat material can be caused to evaporate at a high rate, of 1.6 g/s or more per $cm^2$ of liquid surface area (i.e. 1.6 g/s·$cm^2$ or more).

The present invention provides a battery (for instance, a lithium secondary battery) that is constructed using an electrode produced in accordance with any one of the production methods disclosed herein. The battery exhibits superior battery performance by virtue of being constructed using, as at least one of the electrodes, an electrode (for instance, the negative electrode) that boasts good adhesion between a collector and an active material layer, as described above. For instance, a battery that satisfies at least one property from among superior output characteristic, high cycle durability and good production efficiency, can be provided by constructing the battery using the abovementioned electrode.

Such a battery is appropriate as a battery that is installed in vehicles such as automobiles. Therefore, the present invention provides a vehicle that is equipped with any one of the batteries (for instance, in the form of a battery pack of a plurality of connected batteries) disclosed herein. In particular, the battery affords high output at a low weight, and hence the battery is a lithium secondary battery (typically, a lithium ion battery) and an appropriate vehicle herein is a vehicle (for instance, an automobile) equipped with the lithium secondary battery as a source of power (typically, a source of power in a hybrid vehicle or electric vehicle).

DESCRIPTION OF EMBODIMENTS

Embodiments of the present invention are explained below with reference to accompanying drawings. In the drawings below, members and sites that elicit identical effects are denoted with identical reference numerals. The dimensional relationships (length, width, thickness and so forth) in the drawings do not reflect actual dimensional relationships. Any features other than the features specifically set forth in the present description and which may be necessary for carrying out the present invention (for instance, the configuration and production method of electrode bodies that comprise a positive electrode and a negative electrode, the configuration and production method of a separator and an electrolyte, as well as ordinary techniques relating to the construction of the battery of the present invention and other batteries) can be regarded as instances of design matter that a person skilled in the art can address on the basis of known techniques in the technical field in question.

Figure 1:
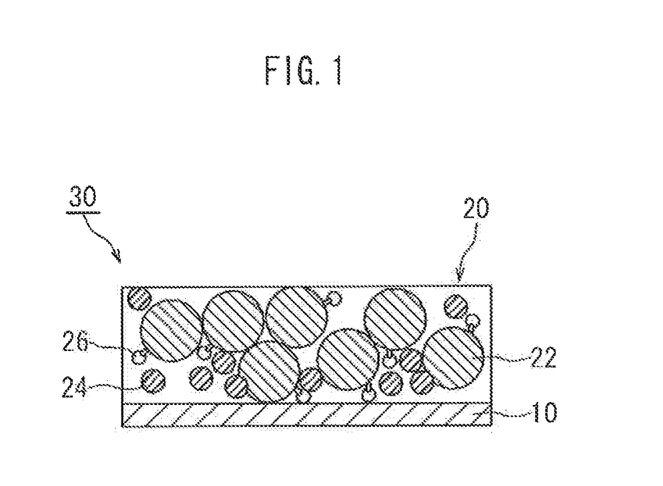
FIG. 1 is a cross-sectional diagram illustrating schematically an electrode according to an embodiment of the present invention.
Figure 3:
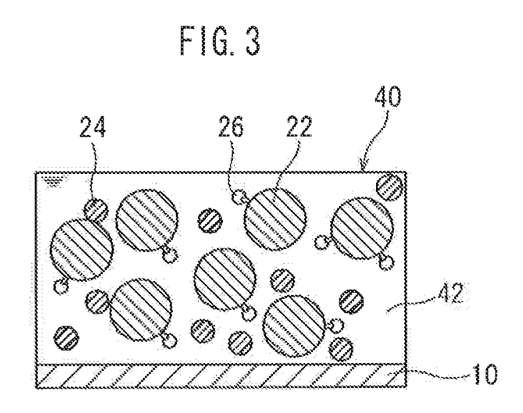
FIG. 3 is a process cross-sectional diagram illustrating schematically an electrode production process according to an embodiment of the present invention.
Figure 4:
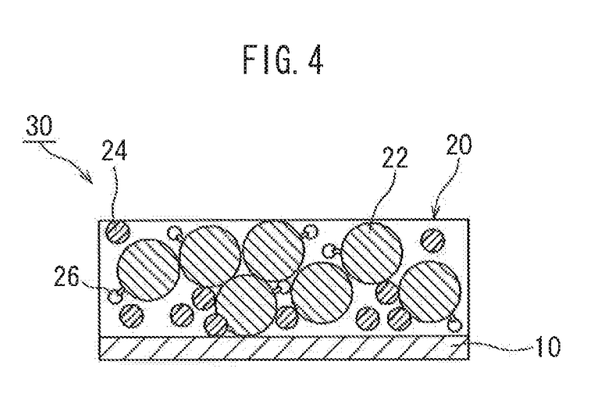
FIG. 4 is a process cross-sectional diagram illustrating schematically an electrode production process according to an embodiment of the present invention.

The electrode production method disclosed herein is a production method of an electrode 30 having a configuration wherein an active material layer 20, which comprises an active material 22 and polymer materials 24, 26, is held on a collector 10, as illustrated in FIG. 1, The method has a step of coating the collector 10 with an active material layer forming paste 40 that comprises the active material 22 and the polymer materials 24, 26 in a solvent (for instance, water) 42, as illustrated in FIG. 3, and a step of drying the applied paste coat material 40, to form thereby the active material layer 20 on the collector 10, as illustrated in FIG. 4.

In the present embodiment, polymer fibers 26 having undergone a fibrillation process are used as at least one type of the abovementioned polymer materials. The polymer materials contain the first polymer 24 that functions as a binder and the second polymer 26 that functions as a thickener of the paste 40, in the active material layer 20. The fibrillated polymer fibers 26 are used as the abovementioned second polymer (thickener).

Figure 2:
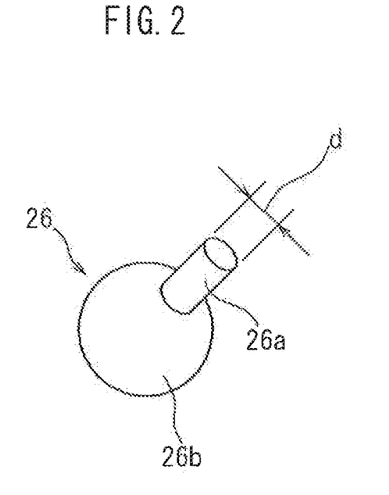
FIG. 2 is a diagram illustrating schematically fibrillated polymer fibers according to an embodiment of the present invention.

As illustrated in FIG. 2, unraveled whisker-shaped fine fibers (fibrils) 26a are formed on the surface of the fibrillated polymer fibers (herein the thickener) 26. As a result, the polymer fibers exhibit larger surface irregularities, increased frictional resistance with a solvent, and lower mobility in the solvent (ease of motion of the polymer fibers in the solvent 42) than polymer fibers that have not been fibrillated. For reasons of convenience only one fibril 26a has been depicted in FIG. 2.

In a production method having the above features, the mobility of the thickener (second polymer) 26 decreases as a result of the fibrillation process, and hence it becomes possible to suppress the phenomenon whereby the thickener 26 in the vicinity of the collector 10 rises up to the surface layer section of the paste coat material 40 accompanying the binder (first polymer) 24, even if convection occurs during drying of the paste coat material 40. As a result, an amount of binder and thickener in the vicinity of the collector 10 can be secured, and adhesion between the active material layer 20 and the collector 10 can be enhanced. By virtue of the above features, thus, segregation between thickener and binder caused by migration can be eliminated or mitigated, and it becomes possible to produce the electrode 30 that comprises the active material layer 20 having good adhesion towards the collector 10.

Although not meant to be particularly limited thereto, the present embodiment will be explained in detail below mainly in the form of an example of the production of a negative electrode for lithium secondary batteries (typically, lithium ion batteries).

As the negative electrode collector 10 that is used in the present embodiment there is preferably used a collector that comprises a metal having good conductivity (for instance, a metal such as aluminum, nickel, copper, stainless steel or the like, or an alloy having one of the foregoing metals as a main component). In the production of a negative electrode for lithium secondary batteries, for instance, there is preferably used a collector made of copper (comprising copper or an alloy (copper alloy) having copper as a main component).

The active material layer forming paste 40 used in the present embodiment is prepared by mixing a negative electrode active material (typically, in the form of a powder) 22, a binder (first polymer) 24, and a thickener (second polymer) 26 in the suitable solvent.

As an appropriate example of the solvent 42 that is used in the paste, there is preferably used an aqueous solvent, in terms of, for instance, mitigating environmental load, reducing material costs, simplifying equipment, reducing waste, and enhancing workability. Water or a mixed solvent having water as a main component is preferably used as an aqueous medium. As solvent components other than water that make up the mixed solvent, there can be used, for instance, one or two or more organic solvents (lower alcohols, lower ketones or the like) that can be mixed uniformly with water. For instance, there is preferably used an aqueous solvent in which 50 wt % or more (more preferably 80 wt % or more, yet more preferably 90 wt % or more) of the aqueous solvent is water. A particularly preferred example is an aqueous solvent comprising substantially water. The solvent is not limited to an aqueous solvent, and there may be used a nonaqueous solvent (organic solvent having mainly a dispersion medium of the active material). For instance, N-methylpyrrolidone (NMP) can be used as the nonaqueous solvent.

The negative electrode active material 22 that used in the present embodiment is not particularly limited, so long as it is identical to those that are used in typical lithium ion secondary batteries. Typical examples of the negative electrode active material 22 that is used in the negative electrode include, for instance, carbon-based materials such as graphite carbon, amorphous carbon or the like; lithium transition metal complex oxides (for instance a lithium-titanium complex oxide) and lithium-transition metal complex oxides.

The binder (first polymer) 24 that is used in the present embodiment is not particularly limited, so long as it is identical to binders that are used in conventionally ordinary lithium secondary battery electrodes. For instance, there can be used a water-soluble or water-dispersible polymer such as styrene-butadiene rubber (SBR), carboxymethyl cellulose (CMC), polytetrafluoroethylene (PTFE), polyethylene (PE), polyacrylic acid (PAA) or the like. Alternatively, there can be used an organic solvent-based polymer such as polyvinylidene fluoride (PVDF), a polyvinylidene fluoride-hexafluoropropylene copolymer (PVDF-HFP) or the like.

The thickener (second polymer) 26 that is used in the present embodiment is not particularly limited, so long as it functions as the thickener of the above-described paste, and is a fibrous polymer that is amenable to a fibrillation process. Preferably, there can he used, for instance, cellulosic polymer fibers of carboxymethyl cellulose (CMC), methyl cellulose (MC), hydroxypropyl methylcellulose (HPMC), hydroxyethyl methylcellulose (HEMC) or the like. Alternatively, there can be used polymer fibers of polyvinyl alcohol (PVA), an ethylene-vinyl alcohol copolymer (EVOH) or the like. The abovementioned polymer fibers can be used singly or concomitantly in appropriate combinations.

The method for fibrillating polymer fibers may be, for instance a method that involves pulverizing aggregates (lumps) of polymer fibers in a jet mill, rotary mill, attritor (for instance, a mass-collider attritor), a refiner, a high-pressure homogenizer or the like. Mechanical shear forces and compressive forces are imparted to the polymer fibers using the foregoing apparatuses, so that, as a result, the polymer fibers split in a direction parallel to the fiber axis, and unravel to develop thereby fine fibers (fibrils) 26a on the surface. Frictional resistance with the solvent increases and mobility in the solvent decreases by virtue of the presence of the fine fibers (fibrils) 26a. The pulverization conditions differ depending on the pulverization equipment that is used, but may involve a pulverization pressure ranging from 0.015 MPa to 3.5 MPa and pulverization count ranging from one to five pulverization runs, in a case where, for instance, a jet mill is used. Pulverization may be dry or wet pulverization.

An appropriate fiber diameter d (FIG. 2) of the fine fibers (fibrils) 26a that appear on the surface of the polymer fibers 26 as a result of the fibrillation process ranges from about 0.3 μm to 1.0 μm. When the fiber diameter d is excessively larger than the above range, not enough surface irregularities can be achieved, and hence the migration phenomenon during drying may fail to be suppressed, and adhesion between the active material layer 20 and the collector 10 may decrease. if the fiber diameter d is smaller than the above range, the viscosity of the active material layer forming paste 40 increases excessively, and hence bubbles that become entrained during production of the paste 40 are not removed before accomplishing drying, and may give rise to pinholes inside the electrode 30. Therefore, the fiber diameter d (FIG. 2) of the fibrils 26a of the fibrillated polymer fibers (i.e. the fine fibers that form on the surface of the polymer fibers) ranges appropriately from about 0.3 μm to 1.0 μm, preferably from 0.4 μm to 0.9 μm in ordinary cases, and more preferably, for instance, from 0.5 μm to 0,8 μm. The fiber diameter of the fibrils 26a can be grasped, for instance, by image analysis using a scanning electron microscope (SEM).

Although not particularly limited thereto, the fiber diameter (thickness) of a backbone portion 26b of the polymer fibers is appropriately set to range from about 3 µm to 20 µm, and more preferably, for instance, from 3 µm to 10 µm (for instance, about 5 µm). The fiber length of the backbone portion 26b is appropriately set to range from about 0.1 µm to 5 µm, and more preferably, for instance, from 0.3 µm to 2 µm. For instance, polymer fibers can be used wherein the fiber diameter (thickness) of the backbone portion 26b of the polymer fibers ranges from about 3 µm to 10 µm, and the fiber length ranges from about 1 µm to 5 µm.

Although not particularly limited thereto, the solids content of the negative electrode active material layer forming paste is preferably about 30% or greater (typically, from 30% to 90%), and ranges preferably from about 40% to 60%. The proportion of negative electrode active material in the paste solid fraction is preferably of about 50 wt % or greater (typically, ranging from 50wt % to 99.5wt %) and preferably from about 70 wt % to 99wt %. The proportion of binder in the paste solid fraction can be, for instance, of 10 wt % or less, and ranges preferably from about 0.5 wt % to 6 wt % (for instance, from 1 wt % to 3 wt %). The proportion of thickener in the paste solid fraction can be, for instance, of 10 wt % or less, and ranges preferably from about 0.5 wt % to 6 wt % (for instance, from 1 wt % to 5 wt %).

The operation of coating the negative electrode collector 10 with such a negative electrode active material layer forming paste 40 may be identical to that in the production of conventionally ordinary negative electrodes for lithium secondary batteries. For instance, the negative electrode collector 10 may be coated, to a uniform thickness, with a predetermined amount of the active material layer forming paste 40, using an appropriate coating device (die coater or the like). The paste coat material 40 (FIG. 3) can be formed as a result.

After coating, the paste coat material 40 is dried using an appropriate drying means, as a result of which there is obtained the negative electrode 30 (FIG. 4) in which the negative electrode active material layer 20 is formed on the negative electrode collector 10. The drying method of the paste coat material 40 may be identical to those in the production of conventionally ordinary negative electrodes for lithium secondary batteries. For instance, the paste coat material 40 can be dried by passing through an appropriate drying oven, where hot air strikes both faces of the collector 10. The temperature of the hot air is not particularly limited, but ranges appropriately from about 70° C. to 160° C., and more preferably, for instance, from 80° C. to 120° C. in a case where, for instance, an aqueous solvent is used.

The fibrillated polymer fibers (thickener) 26 are used in the present configuration. The fibrillated polymer fibers 26 have multiple fine fibers (fibrils) on the surface. Therefore, adhesiveness to the active material 22 is better and frictional resistance to the solvent 42 is greater, and moreover mobility (ease of motion) in the paste coat material 40 is lower, than in the case of polymer fibers that are not fibrillated. As a result, there is suppressed the phenomenon (migration) whereby polymer fibers (thickener) 26 in the vicinity of the collector 10 rise up to the surface layer section of the paste coat material 40 together with the binder 24, and there is secured an appropriate a binder amount in the vicinity of the collector 10, even if convection occurs during drying of the paste coat material 40, In the technology disclosed herein, it is not necessary to address the occurrence of uneven distribution of the polymer materials (binder 24 and thickener 26), caused by migration, when setting the drying rate of the paste coat material 40. Therefore, the paste coat material 40 can be dried quickly. For instance, the solvent in the paste coat material can he caused to evaporate at a high rate, of 1.6 g/s or more per cm$^2$ of liquid surface area (i.e. 1.6 g/s·cm$^2$ or more), whereby electrode productivity is greatly enhanced.

Thus, it becomes possible to produce a negative electrode 30 for batteries having a structure in which the negative electrode active material layer 20 is held on the negative electrode collector 10. After drying, the thickness and density of the negative electrode active material layer 20 can be adjusted by performing, as the case may require, an appropriate pressing process (various conventionally known pressing methods can be resorted to herein, for instance roll pressing, plate pressing or the like).

FIG. 4 illustrates schematically the cross-sectional structure of the negative electrode 30 for lithium secondary batteries that is preferably produced in accordance with the electrode production method disclosed herein. The negative electrode 30 has a configuration wherein the active material layer 20, which comprises the active material 22, the binder 24 and the thickener 26, is held on the collector 10. As illustrated in FIG. 3, the collector 10 is coated with the active material layer forming paste 40 that comprises the active material 22, the binder 24 and the thickener (fibrillated polymer fibers) 26 in a solvent, and the applied paste coat material 40 is then dried, as a result of which the active material layer 20 is formed on the collector 10. It becomes thereby possible to suppress segregation of the binder 24 and the thickener 26 in the surface layer section of the active material layer 20, and to improve adhesion between the active material layer 20 and the collector 10. Since the binder 24 and the thickener 26 do not segregate at the surface layer section of the active material layer 20, it becomes possible to lower the reaction resistance of the surface layer section of the active material layer, and to obtain an electrode characteristic that boasts excellent output characteristic (in particular, input and output characteristics for large currents).

The electrode obtained as described above (for instance, negative electrode) is excellent in adhesion between the active material layer and the collector, as described above, and hence is preferably used as a constituent element of batteries of various configurations, or a constituent element (for instance, negative electrode) of an electrode body that is built into such batteries. For instance, the electrode can be preferably used as a constituent element of a lithium secondary battery that is provided with a negative electrode produced in accordance with any one of the method disclosed herein, a positive electrode (Which may be a positive electrode produced in accordance with the present invention), an electrolyte disposed between the positive and negative electrodes, and typically a separator (optionally omitted in batteries that utilize a solid-state or gel-like electrolyte) that separates the positive and negative electrodes. The structure and size of an outer container (for instance, metallic chassis or laminate film structure) that makes up the battery, as well as the structure of the electrode body that has the positive and negative electrode collectors as main constituent elements (for instance, a wound structure or stacked structure) are not particularly limited.

Figure 5:
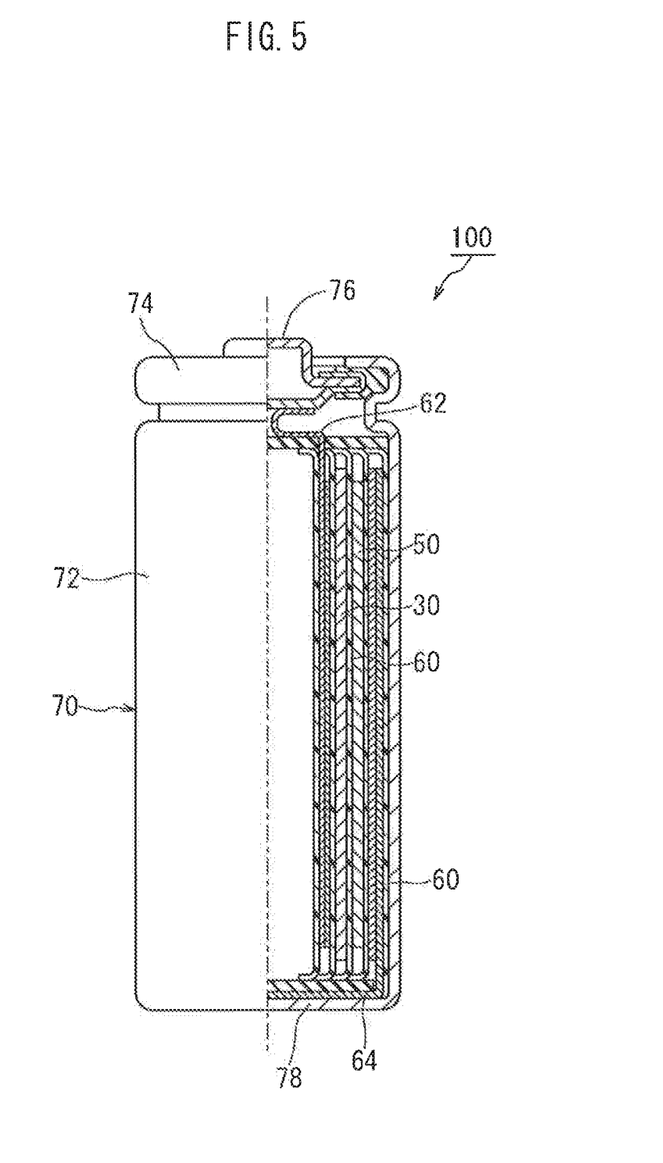
FIG. 5 is a diagram illustrating schematically a battery according to an embodiment of the present invention.
Figure 6:
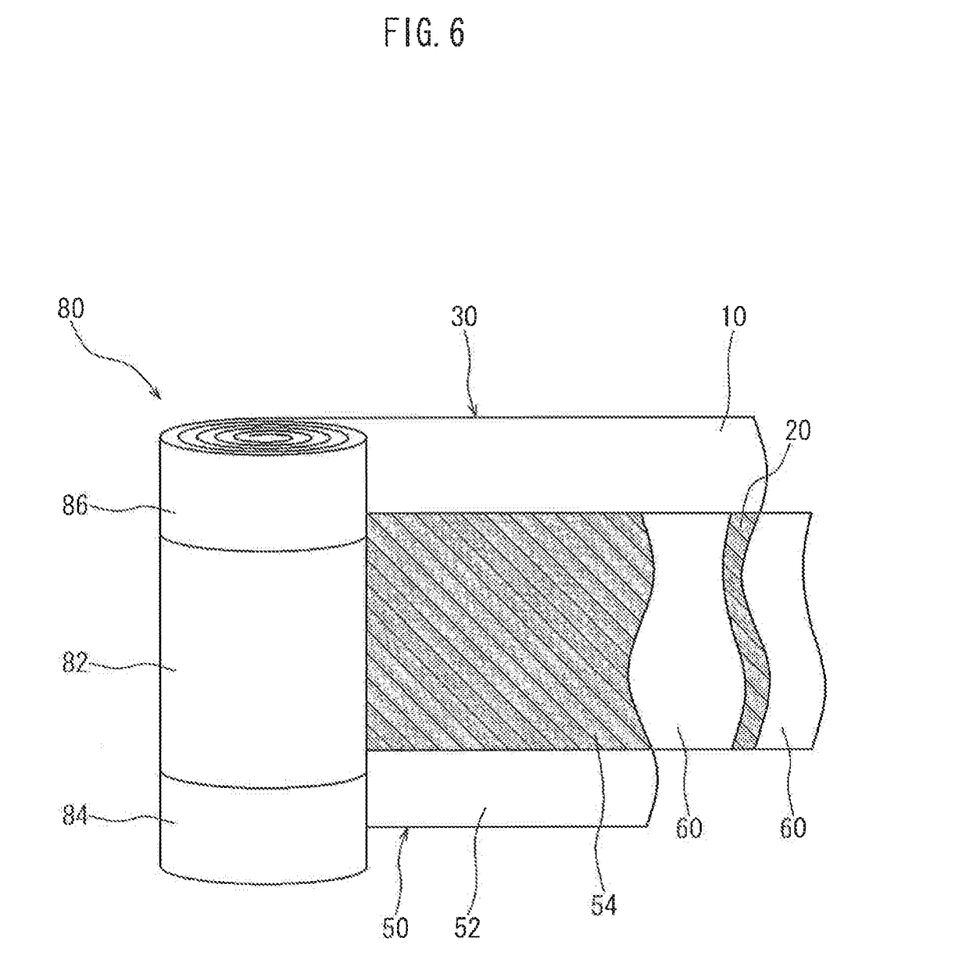
FIG. 6 is a diagram illustrating schematically a wound electrode body according to an embodiment of the present invention.

An explanation follows next, with reference to the schematic diagrams of FIG. 5 and FIG. 6, on an embodiment of a lithium secondary battery that is constructed using the negative electrode (negative electrode sheet) 30 produced in accordance with the above-described method. An example is explained next, thought not meant to be limiting in any way, of a lithium secondary battery (lithium ion battery) having a configuration in which an electrode body that is wound (wound electrode body) and a nonaqueous electrolyte solution are housed in a cylindrical container.

A lithium secondary battery 100 has a configuration wherein a electrode body (wound electrode body) 80, of a form that results from winding an elongate positive electrode sheet 50 and an elongate negative electrode sheet 30 with an elongate separator 60 interposed in between, is housed in a container 70 having a shape (cylindrical shape) that enables the wound electrode body 80 to be accommodated therein together with a nonaqueous electrolyte solution, not shown.

The container 70 comprises a container main body 72 shaped as a bottomed cylinder having an open top end, and a lid body 74 that plugs the opening of the container main body 72. As the material that makes up the container 70 there is preferably used, for instance, a metallic material such as aluminum, steel, Ni-plated SUS or the like (in the present embodiment, Ni-plated SUS). Alternatively, the container 70 may be molded out of a resin material such as PPS, a polyimide resin or the like. On the top face of the container 70 (i.e. on the lid body 74) there is provided a positive electrode terminal 76 that is electrically connected to the positive electrode 50 of the wound electrode body 80, while a negative electrode terminal 78 that is electrically connected to the negative electrode 30 of the wound electrode body 80 is provided on the lower face of the container 70 (in the present embodiment, the container main body 72 doubles as the negative electrode terminal 78). The wound electrode body 80 is housed inside the container 70 together with a nonaqueous electrolyte solution, not shown.

The wound electrode body 80 according to the present embodiment is identical to a wound electrode body of an ordinary lithium secondary battery, except for the configuration of the layer (negative electrode active material layer) 20 that comprises the active material and that is provided on the negative electrode sheet 30. Prior to the assembly stage, the wound electrode body 80 has, as illustrated in FIG. 6, an elongate (band-like) sheet structure.

The positive electrode sheet 50 has a structure wherein a positive electrode active material layer 54 comprising a positive electrode active material is held on both faces of an elongate sheet-shaped and foil-like positive electrode collector 52. A positive electrode active material layer non-formation section is formed such that the positive electrode active material layer 54 is not deposited at one side edge, in the width direction of the positive electrode sheet 50 (lower side edge portion in the figure), and the positive electrode collector 52 is exposed over a given width.

The negative electrode sheet 30 as well has a structure wherein, as in the case of the positive electrode sheet 50, the negative electrode active material layer 20 that comprises the negative electrode active material is held on both faces of the elongate sheet-shaped and foil-like negative electrode collector 10. A negative electrode active material layer non-formation section is formed such that the negative electrode active material layer 20 is not deposited at one side edge, in the width direction of the negative electrode sheet 30 (upper side edge portion in the figure), and the negative electrode collector 10 is exposed over a given width.

To produce the wound electrode body 80, the positive electrode sheet 50 and the negative electrode sheet 30 are stacked with the separator sheet 60 interposed in between. Herein, the positive electrode sheet 50 and the negative electrode sheet 30 are overlaid on each other slightly offset in the width direction, in such a manner that the positive electrode active material layer non-formation portion of the positive electrode sheet 50 and the negative electrode active material layer non-formation portion of the negative electrode sheet 30 jut beyond respective sides of the separator sheet 60, in the width direction. The wound electrode body 80 can be produced then by wiring the stack resulting from such overlaying.

A wound core portion 82 (i.e. portion of close stacking between the positive electrode active material layer 54 of the positive electrode sheet 50, the negative electrode active material layer 20 of the negative electrode sheet 30, and the separator sheet 60) is formed at the central portion of the wound electrode body 80 in the winding axial. direction. The electrode active material layer non-formation portions of the positive electrode sheet 50 and the negative electrode sheet 30 jut outward of the wound core portion 82 at respective end. portions of the wound electrode body 80, in the winding axial direction. A positive electrode lead terminal 62 and a negative electrode lead terminal 64 are respectively attached to a positive electrode-side jutting portion (i.e. non-formation portion of the positive electrode active material layer 54) 84 and a negative electrode-side jutting portion (i.e. non-formation portion of the negative electrode active material layer 20) 86; the positive electrode lead terminal 62 and the negative electrode lead terminal 64 are electrically connected to the above-described. positive electrode terminal 76 and negative electrode terminal 78 (herein, the container main body 72 doubles as the negative electrode terminal 78) respectively.

The constituent elements that make up the wound electrode body 80 are not particularly limited, and, except for the negative electrode sheet 30, may be identical to those of wound electrode bodies in conventional lithium secondary batteries. For instance, the positive electrode sheet 50 can be formed by applying the positive electrode active material layer 54, having a positive electrode active material for lithium secondary batteries as a main component, onto the elongate positive electrode collector 52. An aluminum foil or another metal foil appropriate for positive electrodes is suitably used for the positive electrode collector 52. The positive electrode active material is not particularly limited, and there can be used one or two or more materials that are conventionally used in lithium secondary batteries. Appropriate examples include, for instance, a positive electrode active material that has, as a main component, an oxide (lithium transition metal oxide) comprising lithium and a transition metal element as constituent metal elements, for instance lithium nickel oxide ($LiNiO_2$), lithium cobalt oxide ($LiCoO_2$) and lithium manganese oxide ($LiMn_2O_4$) or the like.

Examples of the separator sheet 60 that is appropriate for use between the positive and negative electrode sheets 50, 30 include porous polyolefin resins. For instance, a porous separator sheet in the form of a synthetic resin (such as polypropylene) can be appropriately used as the separator sheet 60. The separator may he unnecessary (i.e. the electrolyte itself may function as the separator) in cases where a solid electrolyte or a gel-like electrolyte is used as the electrolyte.

The wound electrode body 80 having such a configuration is housed in the container main body 72, and an appropriate nonaqueous electrolyte solution is arranged in (poured into) the container main body 72. The nonaqueous electrolyte solution that is housed together with the wound electrode body 80 in the container main body 72 is not particularly limited, and may he identical to nonaqueous electrolyte solutions that are used in conventional lithium secondary batteries. Such nonaqueous electrolyte solutions have typically a composition wherein a supporting salt is incorporated into an appropriate nonaqueous solvent. As the nonaqueous solvent there can be used, for instance, ethylene carbonate (EC), ethyl methyl carbonate (EMC), dimethyl carbonate (DMC), diethyl carbonate (DEC), propylene carbonate (PC) and the like. As the abovementioned supporting salt there can be used, preferably a lithium salt such as $LiPF_6$, $LiBF_4$, $LiAsF_6$, $LiCF_3SO_3$, $LiClO_4$ or the like. For instance, there can be preferably used a nonaqueous electrolyte solution at contains about 1 mol/liter of $LiPF_6$, as a supporting salt, in a mixed solvent of EC, EMC and DMC at a 3:4:3 volume ratio.

The nonaqueous electrolyte solution is housed, together with the wound electrode body 80, in the container main body 72, and the opening of the container main body 72 is sealed with the lid body 74. This completes the construction (assembly) of the lithium secondary battery 100 according to the present embodiment. The sealing process of the container main body 72 and the process of arranging (pouring) electrolyte solution can be performed in accordance with methods identical to those of in the production of conventional lithium secondary batteries. Thereafter, the battery is subjected to conditioning (initial charge and discharge). Various other processes, such as degassing, quality inspection and the like may also be performed, as the case may require.

The present invention will be explained in detail next based on examples.

<Production of Fibrillated CMC (thickener)>

Fibrillated CMC was produced by pulverizing aggregates (lumps) of carboxymethyl cellulose (CMC; fiber length 1.2 µm), as the thickener, using a PJM jet mill (by Nippon Pneumatic Mfg. Co., Ltd., pulverization pressure 0.9 MPa, pulverization count: once) and using a super mass-collider (by Masuko Sangyo Co., Ltd.; revolutions 3000 rpm, grindstone clearance 5 µm), Pulverization was performed by appropriately modifying the shear forces and compression forces that acted on the CMC, and the resulting product was sorted using an MDS-1 air classifier (by Nippon Pneumatic Mfg, Co., Ltd.), to yield six types of CMC (samples 1 to 6) having dissimilar fiber diameters d (FIG. 2) of the fibrils 26a. The respective fiber diameter d of the fibrils of each sample is given in Table 1.

prepared under the same conditions as in samples 1 to 6, except that herein there was used CMC that had not been fibrillated.

Table 1 gives the viscosity (mPa·s) of the negative electrode active material layer pastes of samples 1 to 7. Paste viscosity tended to increase with decreasing fiber diameter d of the fibrils, In particular, paste viscosity was 4500 mPa·s or greater when the fiber diameter d of the fibrils was 0.3 µm or smaller. Viscosity was measured, after the liquid temperature had been adjusted to 25° C., using a BH viscometer (by TOKIMEC), at rotor revolutions of 20 rpm.

<Production of a Negative Electrode Sheet>

Each of the seven types of negative electrode active material layer pastes obtained as described above was coated onto both faces of an elongate sheet-shaped copper foil (negative electrode collector: thickness 10 µm), and was dried, to produce a negative electrode sheet 30 in which the negative electrode active material layer 20 was provided on both faces of the copper foil 10. The coating amount of the negative electrode active material layer forming paste was adjusted to about 6 mg/cm$^2$ (solid fraction basis) for both faces combined. After drying, the whole was pressed to yield a thickness of the negative electrode active material layer of about 02 mm, The surface of the seven types of negative electrode sheets obtained as described above was observed under an electron microscope (SEM). The results are given in Table 1, In sample 5, where the fiber diameter d of the fibrils was set to 0.2 µm, numerous pinholes were observed on the surface of the negative electrode active material layer (456 pinholes per 1000 cm$^2$ of the negative electrode sheet). It is deemed that these pinholes result from bubbles that become entrained during the production of the negative electrode active material layer forming paste and that fail to be removed through drying, remaining thereafter in the form of pinholes in the negative electrode active material layer. In sample 6, where the fiber

TABLE 1

| | Thickener | | Negative electrode paste Paste | Surface quality of negative electrode sheet | | Evaluation test | |
|---|---|---|---|---|---|---|---|
| | Fibrillation process | Fiber diameter d [µm] | viscosity [mPa·s] | Aggregate count | Pinhole count | Peel strength [N/m] | Capacity retention rate [%] |
| Sampte 1 | Yes | 0.3 | 4500 | 0 | 3 | 6.8 | 97 |
| Sample 2 | Yes | 1.0 | 2790 | 2 | 0 | 7.0 | 96 |
| Sample 3 | Yes | 0.5 | 3500 | 0 | 0 | 7.2 | 98 |
| Sample 4 | Yes | 0.8 | 3450 | 0 | 0 | 7.1 | 98 |
| Sample 5 | Yes | 0.2 | 10000 | 2 | 456 | 6.3 | 82 |
| Sample 6 | Yes | 1.2 | 670 | 12 | 13 | 3.2 | 85 |
| Sample 7 | No | — | 500 | 345 | 12 | 2.7 | 40 |

<Preparation of a Negative Electrode Active Material Layer Paste>

Negative electrode active material layer pastes were prepared using a respective fibrillated CMC (thickener) of respective samples 1 to 6. Specifically, each negative electrode active material layer paste 40 was prepared by dispersing a flake graphite powder, as the negative electrode active material, styrene-butadiene rubber (SBR) as the binder, and the respective fibrillated CMC as the thickener, in water, to a weight ratio of the foregoing materials of 96:2:2, and a solid fraction concentration of about 52wt %. For comparison purposes, a negative electrode active material layer paste was also prepared (sample 7) using CMC that had not been fibrillated. The negative electrode active material layer paste was diameter d of the fibrils was set to 1.2 µm, numerous aggregates of undissolved component of the fibrillated CMC, referred to as microgels, were observed on the surface of the negative electrode active material layer (12 aggregates per 1000 cm$^2$ of the negative electrode sheet).

Virtually no pinholes or aggregates such as those described above were observed in samples 1 to 4, where the fiber diameter d of the fibrils was set to range from 0.3 µm to 1.0 µm.

<Peel Strength Test>

The adhesion between the collector 10 and the negative electrode active material layer 20 of each negative electrode sheet in samples 1 to 7 was evaluated based on a 90° peel test. The 90° peel test was performed in accordance with JIS-C6481-1995. Specifically, the face on the side of the negative electrode active material layer was fixed to a stand using double sided tape; the negative electrode collector was pulled in a direction perpendicular to the surface of the negative electrode active material layer, to continuously strip off thereby about 50 mm at a rate of 50 mm per minute. The lowest value of load over the course of peeling was measured as the peel strength (N/m). The adhesion between the negative electrode collector and the negative electrode active material layer was evaluated. The results are given in corresponding positions in Table 1.

As Table 1 shows, peel strength was clearly enhanced in samples 1 to 6, where fibrillated CMC was used, as compared with sample 7, where there was used CMC that had not been fibrillated, Among the tested negative electrode sheets, sample 6, where the fiber diameter d of the fibrils was set to 1.2 µm, exhibited formation of numerous microgels (aggregates). Therefore, the negative electrode active material sloughed off, starting at the microgels, and peel strength decreased somewhat. In sample 5, where the fiber diameter d of the fibrils was set to set to 0.2 µm, numerous pinholes were formed, and hence the negative electrode active material sloughed off, starting at the pinholes, and peel strength decreased somewhat. By contrast, in samples 1 to 4 where the fiber diameter d of the fibrils was set to range from 0.3 µm to 1.0 µm, it was possible to realize very high peel strength, of 6.8 N/m or higher. From the viewpoint of enhancing peel strength, the fiber diameter d of the fibrils is preferably set to range from about 0.2 µm to 1.2 µm, more preferably from 0.3 µm to 1.0 µm, and particularly preferably from 0.5 µm to 0.8 µm. In terms of paste viscosity (for instance, paste coatability), the fiber diameter of the fibrils is more preferably set to range from 0.5 µm to 0.8 µm.

Next, lithium secondary batteries for testing were produced using the negative electrode sheets according to samples 1 to 7. The lithium secondary batteries for testing were produced as described below.

<Production of a Positive Electrode Sheet>

A positive electrode active material layer forming paste was prepared by mixing, in N-methylpyrrolidone (NMP), a powder of lithium nickel manganese cobalt oxide ($LiNi_{1/3}Co_{1/3}Mn_{1/3}O_2$) as a positive electrode active material, acetylene black (AB) as a conductive aid, and polyvinylidene fluoride (PVdF), as a binder, to a weight ratio of the foregoing of 90:8:2 and to a solid fraction concentration of about 48wt %. The positive electrode active material layer forming paste was coated, in the form of a band, onto both faces of an elongate sheet-shaped. aluminum foil (positive electrode collector 52; thickness 15 µm), and was dried, to prepare thereby a positive electrode sheet 50 in which the positive electrode active material layer 54 was provided on both faces of the positive electrode collector 52. The coating amount of the positive electrode active material layer forming paste was adjusted to about 8.4 mg/cm² (solid fraction basis) for both faces combined. After drying, the whole was pressed to yield a thickness of the positive electrode active material layer 54 of about 150 µm.

<Production of Lithium Secondary Batteries >

Respective wound electrode bodies 80 were produced by winding the positive electrode sheet 50 and each negative electrode sheet 30 with two separator sheets (porous polypropylene) 60 interposed therebetween. Each wound electrode body 80 thus obtained was housed, together with a nonaqueous electrolyte solution, in a cylindrical battery container 70 (diameter 17 mm×height 50 mm), and the opening of the battery container 70 was sealed hermetically. As the nonaqueous electrolyte solution there was used a nonaqueous electrolyte solution that contained about 1 mol/liter of $LiPF_6$, as a supporting salt, in a mixed solvent of ethylene carbonate (EC), diethyl carbonate (DEC) and methyl propionate at a 3:5:2 volume ratio. A lithium secondary battery 100 was thus assembled. Thereafter, a respective lithium secondary battery for testing was obtained by performing an initial charge and discharge process (conditioning) in accordance with an ordinary method.

<Charge and Discharge Cycle Test>

The lithium secondary batteries for testing thus obtained (samples 1 to 7) underwent continuously 500 repeated charge-discharge cycles, each of which involved charging up to a voltage of 4.1 V at a constant current of 1500 mA, at 20° C., further charging at a constant voltage of 4.1 V, up to a total charging time of 2 hours, pausing then of 10 minutes, and, after this charging, discharging the battery down to a voltage 3 V, at a constant current of 7200 mA, at 20° C. The capacity retention rate was after the charge and discharge cycle test was calculated on the basis of the discharge capacity at the first cycle and the discharge capacity at the 500-th cycle (=[500th cycle discharge capacity/1st cycle discharge capacity]×100). The results are given in corresponding positions in Table 1.

As Table 1 shows, samples 1 to 6, where fibrillated CMC was used, exhibited a dear enhancement of capacity retention rate after the charge and discharge cycle test as compared with sample 7, where there was used CMC that had not been fibrillated. In the tested batteries, sample 6, where the fiber diameter d of the fibrils was set to 1.2 µm, exhibited formation of numerous microgels (aggregates). Therefore, reactions on the electrode surface were non-uniform, due to the presence of the microgels, and the capacity retention rate dropped somewhat. In sample 5, where the fiber diameter d of the fibrils was set to set to 0.2 µm, numerous pinholes were formed, and hence reactions on the electrode surface were non-uniform due to the presence of the pinholes, and the capacity retention rate dropped somewhat. By contrast, a very high capacity retention rate, of 96% or higher, could be achieved in samples 1 to 4, where the fiber diameter d of the fibrils was set to set to range from 0.3 µm to 1.0 µm. From the viewpoint of enhancing the capacity retention rate, the fiber diameter d of the fibrils is preferably set to range from about 0.2 µm to 1.2 µm, more preferably from 0.3 µm to 1.0 µm, and particularly preferably from 0.5 µm to 0.8 µm. In terms of paste viscosity (for instance, paste coatability), the fiber diameter of the fibrils is more preferably set to range from 0.5 µm to 0.8 µm.

Figure 7:
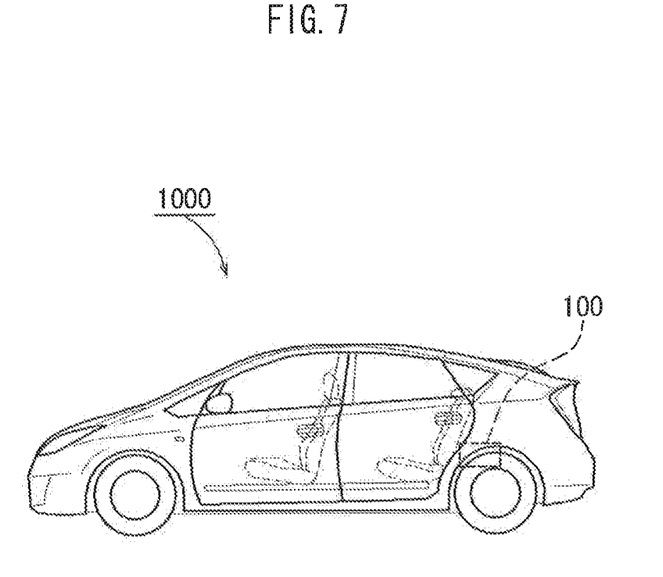
FIG. 7 is a diagram illustrating schematically a vehicle equipped with a battery according to an embodiment of the present invention.

The battery according to the present invention (for instance, lithium secondary battery) affords excellent battery performance, as described above, and hence can be appropriately used, in particular, as a power source for motors (electric motor) that are installed in vehicles such as automobiles. Accordingly, the present invention provides a vehicle 1000 (typically, an automobile, in particular an automobile provided with an electric motor, for instance a hybrid automobile, an electric automobile or a fuel cell automobile), as illustrated in FIG. 7, that is equipped with such a battery 100 (which may be embodied in the form of a battery pack) as a power source.

The present invention has been explained above on the basis of preferred embodiments, but the features disclosed are not limiting features in any way, and, needless to say, may accommodate various modifications.

In the above-described embodiment, for instance, an example has been explained where fibrillated polymer fibers are used as the second polymer that functions as a thickener of a paste, but the present invention is not limited thereto. For instance, fibrillated polymer fibers may be used as the first polymer that functions as a binder in the active material layer. In this case, the mobility of the binder (first polymer) decreases on account of the fibrillation process, and hence the binder in the vicinity of the collector does not rise readily up to the surface layer section of the paste coat material, even if convection occurs during drying of the paste coat material. As a result, it becomes possible to secure an amount of binder in the vicinity of the collector, and to enhance adhesion between the active material layer and the collector.

In the subject matter set forth in the present description, the battery electrode having a configuration wherein an active material layer that comprises an active material and a binder is held on a collector encompasses also a battery electrode wherein the active material layer is split into two, at the central portion, in the thickness direction (i.e. thickness bisection), such that the binder amount comprised in the split portion that is disposed on the collector side of the active material layer (lower layer side) is greater than the binder amount comprised in the split portion disposed on the side opposite to that of the collector (upper layer side). An electrode having such a configuration can be appropriately realized for instance by resorting to any one of the production methods disclosed herein.

The invention claimed is:

1. A method for producing a battery electrode that has a structure in which an active material layer including an active material is held on a collector, the method comprising:
fibrillating cellulosic fibers by a pulverization pressure ranging from 0.015 MPa to 3.5 MPa,
preparing an active material layer forming paste by mixing an active material and the fibrillated cellulosic fibers in a solvent,
applying the active material layer forming paste onto the collector, and
forming an active material layer on the collector by drying the applied paste.

2. The production method according to claim 1, wherein a fiber diameter of fibrils in the fibrillated cellulosic fibers ranges from 0.3 μm to 1.0 μm.

3. The production method according to claim 1, wherein a solvent in the paste coat material is caused to evaporate at a rate of 1.6 g/s·cm$^2$ or higher.

4. The production method according to claim 1, wherein
the electrode is a negative electrode, and
the solvent of the active material layer forming paste is water.

5. A battery comprising a battery electrode produced in accordance with the production method according to claim 1.

6. A battery provided with an electrode that has a structure in which an active material layer is held on a collector, wherein
the active material layer contains an active material and fibrillated cellulosic fibers,
wherein a fiber diameter of fibrils in the fibrillated cellulosic fibers ranges from 0.3 μm to 1.0 μm.

7. The battery according to claim 6, wherein a fiber diameter of a backbone portion of the cellulosic fibers ranges from 3 μm to 20 μm.

8. The battery according to claim 6, wherein a fiber length of a backbone portion of the cellulosic fibers ranges from 0.1 μm to 5 μm.

* * * * *